United States Patent
Volkert et al.

(10) Patent No.: US 6,561,772 B2
(45) Date of Patent: May 13, 2003

(54) MOTOR COOLING FAN HOUSING WITH MUFFLER

(75) Inventors: Michael R. Volkert, Ravenna, OH (US); Daniel L. Kirtz, Stow, OH (US)

(73) Assignee: Ametek, Inc., Kent, OH (US)

( * ) Notice: Subject to any disclaimer, the term of this patent is extended or adjusted under 35 U.S.C. 154(b) by 28 days.

(21) Appl. No.: 09/825,223

(22) Filed: Apr. 3, 2001

(65) Prior Publication Data

US 2002/0140297 A1 Oct. 3, 2002

(51) Int. Cl.[7] .................... F04B 53/00; F04B 35/04; H02K 9/06
(52) U.S. Cl. .................... 417/312; 417/423.8; 310/63
(58) Field of Search .................... 417/312, 357, 417/366, 423.1, 423.5, 423.8; 310/60 R, 63

(56) References Cited

U.S. PATENT DOCUMENTS 3,980,912 A * 9/1976 Panza .................... 181/202
4,150,313 A * 4/1979 Panza .................... 310/51
4,684,835 A   8/1987 Kline, Jr. et al. .............. 310/59
5,156,535 A * 10/1992 Budris et al. ................ 277/405
5,763,969 A * 6/1998 Metheny et al. .............. 310/52

OTHER PUBLICATIONS

Ametek Product Bulletin, Issued Mar. 1998.

* cited by examiner

Primary Examiner—Charles G. Freay
(74) Attorney, Agent, or Firm—Renner, Kenner, Grieve, Bobak, Taylor & Weber

(57) ABSTRACT

A bypass discharge motor assembly with improved noise reduction includes a motor assembly having a rotatable shaft. A working air fan assembly and a cooling fan are rotated by the shaft. A cooling fan housing is coupled to the motor assembly and partially encloses the cooling fan. The cooling fan housing has at least one radial air entry part for radially receiving cooling air drawn into the housing by the cooling fan.

22 Claims, 4 Drawing Sheets

MOTOR COOLING FAN HOUSING WITH MUFFLER

TECHNICAL FIELD

The invention herein resides in the art of dynamo-electric machines such as by-pass vacuum motors, wherein separate sources for working air and motor cooling air are provided. In such devices, one fan system is typically provided to move the working air while another fan system draws ambient air over the motor for cooling the motor's windings. In particular, the invention relates to a motor cooling fan housing with a muffler which provides for radial inflow of cooling air so as to significantly reduce the amount of noise generated by the motor cooling fan.

BACKGROUND ART

By-pass vacuum motors are well-known in the art. By way of example only, wet vacuums are known wherein working air is entrained with water extracted from the surface. Since the working air is entrained with foreign matter, such as water and dirt, a separate fan is provided for purposes of generating airflow over the motor for cooling the same. If the motor is not cooled, the life of the motor is significantly reduced.

As with all vacuum motors, the operating noise levels associated therewith have always been a concern. Such noise is generally attributed to the fan tips passing by fixed elements in the fan and adjacent structure. Not only is the generated noise objectionable acoustically, it also represents wasted energy. Accordingly, it is desirable to reduce the amount of noise in vacuum motors.

Previously, it has been known to maintain the motor in a housing separate from the fan assembly for drawing in the working air. Maintained upon the motor housing is typically a motor cooling fan housing that receives a fan for drawing cooling air across the motor. One advancement in reducing cooling fan noise is exemplified in U.S. Pat. No. 4,684,835, which is incorporated herein by reference. In the aforementioned patent, the air is drawn axially in through the motor cooling fan housing by the motor cooling fan. The inventive concept in this patent is directed to the radially-directed and tapered configuration of the air inlets with respect to the cooling fan. Although this has been found to be an improvement over the art, the air is still drawn in axially and, as such, noise easily emanates from the cooling fan and surrounding housing.

Accordingly, there is a need in the art for a motor cooling fan housing in which the air inlets accommodate the air flow from outside the housing into the motor with reduced turbulence, perturbations, air vortex shedding, and resultant noise.

DISCLOSURE OF INVENTION

In light of the foregoing, it is thus an aspect of the present invention to provide a motor cooling fan housing having radial air inlets which are positioned above the motor cooling fan.

It is another aspect of the present invention to provide a motor cooling fan housing, as set forth above, wherein the cooling fan housing includes a muffler which is positioned in a plane above the cooling fan and which draws ambient air in radially to an area above the cooling fan and which then draws the gathered air in axially.

It is a further aspect of the present invention, as set forth above, wherein the muffler includes a plurality of vanes extending from a top plate to form radial air entry ports between the adjacent vanes.

It is yet another aspect of the present invention, as set forth above, to configure the vanes such that each has an outer radial portion which is concentrically aligned with the top plate's outer periphery, and an inner radial portion extending in toward the top plate's center from the outer radial portion.

It is yet another aspect of the present invention, as set forth above, to provide a muffler in either a unitary configuration such that it can be adapted to existing cooling fan motor housings, or to provide a Muffler that is integral with the cooling fan motor housing.

It is still another aspect of the present invention, as set forth above, to provide the muffler with a fan plate substantially parallel to the top plate and wherein a plurality of outer periphery walls connect the fan plate to the top plate and wherein an outer curvilinear wall extends inwardly from a corresponding outer periphery wall.

It is still a further aspect of the present invention, as set forth above, wherein each curvilinear wall extends inwardly from the corresponding outer periphery wall such that the radial air entry port is continuous with a flow opening centrally disposed between the fan plate and the top plate.

It is an additional aspect of the present invention, as set forth above, wherein the fan plate has a plurality of notches that are contiguous with the flow opening and wherein each notch is positioned between adjacent curvilinear walls.

The foregoing and other aspects of the present invention, which shall become apparent as the detailed description proceeds, are achieved by a bypass discharge motor assembly with improved noise reduction including a motor assembly having a rotatable shaft, a working air fan assembly rotated by the shaft, a cooling fan rotated by the shaft, and a cooling fan housing coupled to the motor assembly and partially enclosing the cooling fan, the cooling fan housing having at least one radial air entry port for radially receiving cooling air drawn into the housing by the cooling fan.

Other aspects of the present invention are attained by a muffler for motor assemblies that include a cooling fan comprising a top plate and a plurality of vanes extending from the top plate wherein adjacent vanes form a radial air entry port therebetween.

Still another object of the present invention is attained by a cooling fan housing for motor assemblies that include a cooling fan, including a sidewall and a muffler integrally extending from the sidewall, the muffler having at least one radial air entry port for receiving air drawn into the housing by the cooling fan.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
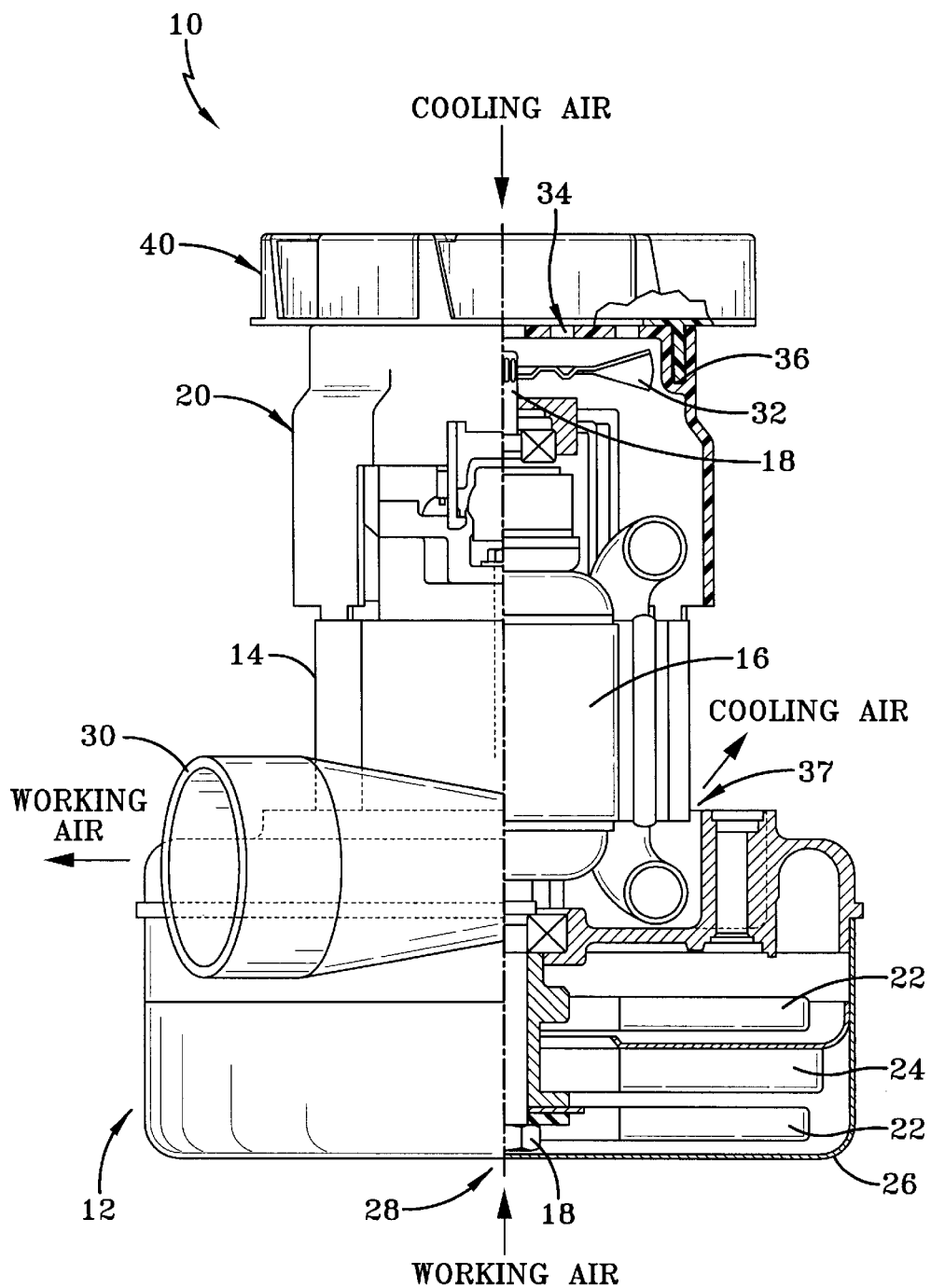
FIG. 1 is an elevational view of a bypass discharge motor assembly shown in partial cross-section.

Referring now to FIGS. 1–4, it can be seen that a bypass discharge motor assembly is designated generally by the numeral 10. The assembly 10 includes a working air fan assembly designated generally by the numeral 12. The assembly 12 is axially positioned with respect to a motor housing 14 which includes a motor 16 that rotates a shaft 18, as is well-known in the art. A cooling fan housing, designated generally by the numeral 20, is coupled to the motor housing 14 opposite the working air fan assembly 12. The assembly 12 includes working air fans 22 and, if required, a stationary fan 24. The fans 22 and 24 are enclosed by a shroud 26 that provides an air inlet 28. On energization of the motor 16, the shaft 18 rotates the working air fans 22 and draws in working air through the air inlet 28. The working air is then driven out by the fans 22 through a discharge 30 for use in the appropriate equipment.

The cooling fan housing 20 is securably attached to the motor housing 14 and encloses the cooling fan 32. As noted in the description of the prior art, the cooling fan housing 20 has a plurality of axial openings 34 for drawing air into the motor housing 14 through the cooling fan housing 20. These axial openings are all within the periphery of the cooling fan 32. The housing 20 has an inset angular channel 36. The housings 14 and 20 include a plurality of outflow holes 37 for the purpose of disbursing the cooling air after it has passed over the motor windings.

Figure 2:
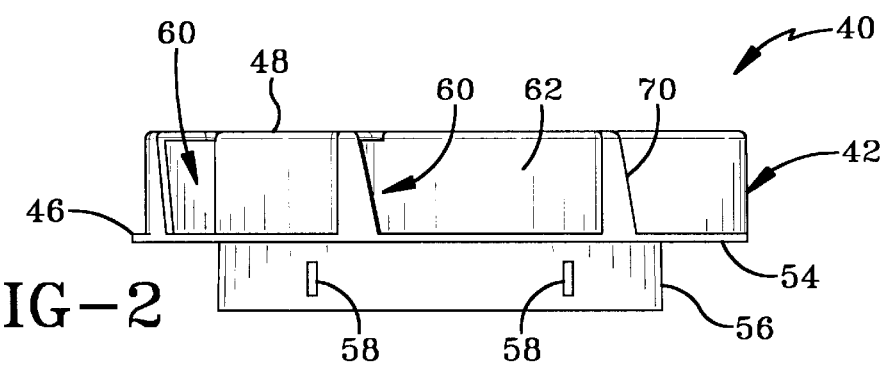
FIG. 2 is a side elevational view of a unitary muffler adaptable to a cooling fan housing.
Figure 3:
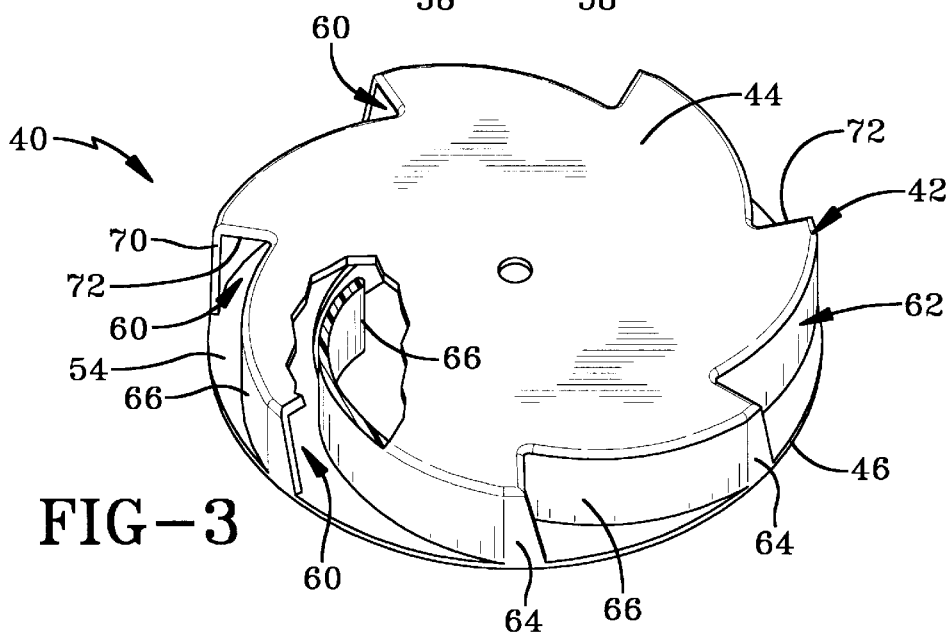
FIG. 3 is a top perspective view of the muffler, partially broken away, shown in FIG. 2.
Figure 4:
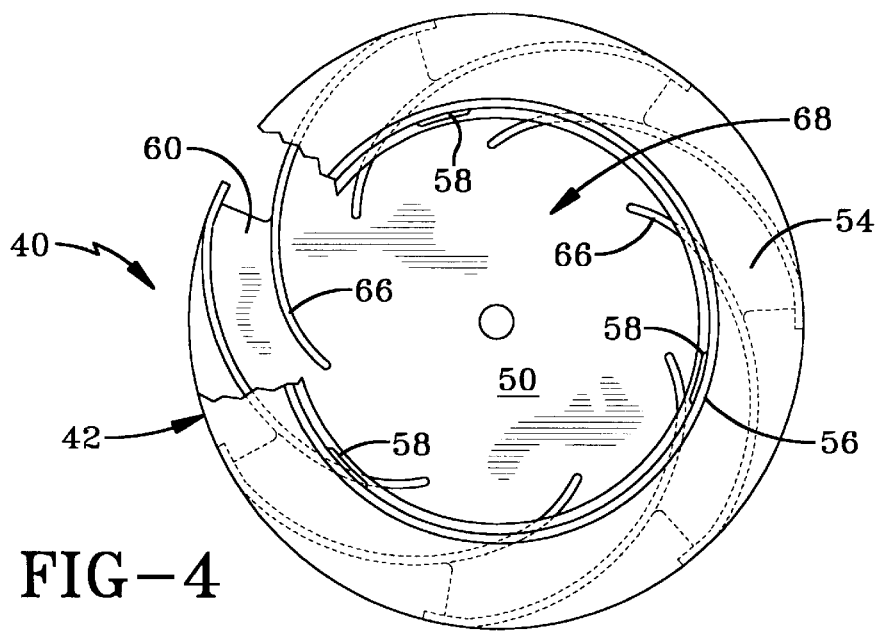
FIG. 4 is a bottom plan view of the muffler, partially broken away, shown in FIG. 2.

As best seen in FIGS. 2–4, a radial inflow cooling fan housing adapter, designated generally by the numeral 40, is coupled to the motor cooling fan housing 20. The adapter 40 may be secured to the fan housing 20 by either a friction fit, or by mechanical fasteners, such as screws, clips, or their functional equivalent. The adapter 40 includes a muffler 42 which is positioned above the plane of the cooling fan housing 20. The muffler includes a top plate 44 which has an outer periphery 46 and an exposed surface 48 facing away from cooling fan 32. The top plate 44 also provides an inner surface 50 that faces the cooling fan 32. A fan plate 54 extends from the muffler 42, wherein the fan plate is substantially parallel to said top plate 44. Extending downwardly and substantially perpendicularly from said fan plate 54 is a side wall 56. A plurality of friction ribs 58 may be disposed on the external or internal surface of the side wall 56 for the purpose of coupling the adapter to the fan housing 20. Indeed, as seen in FIG. 1, the side wall 56 may be received in the annular channel 36.

The muffler 42 includes a plurality of uniformly disposed radial air entry ports designated generally by the numeral 60. Each radial air entry port 60 is radially positioned about the muffler 42 so as to initially pull cooling air into the cooling fan housing in a radial direction and then re-direct the air in an axial direction through the housings. The ports 60 are formed between the top plate 44 and the fan plate 54 having disposed therebetween a plurality of vanes 62 which extend curvilinearly inwardly from the outerperiphery 46. Each vane 62 includes an outer radial portion 64 which is concentrically aligned with the outer periphery 46. Preferably, the outer radial portion 64 matches the outer periphery of the top plate 44, but the radial portion 64 may be smaller in diameter than the top plate. In any event, each outer radial portion 64 extends into an inner guide portion 66 which extends inwardly from the outer periphery 46 toward the center of the top plate 44. The inner guide portions 66 terminate prior to reaching the center of the top plate 44 so as to form a central chamber 68. It will be appreciated that the positioning and curvature of the portions 64 and 66 may be adjusted to maximize the airflow through the housings while also minimizing the amount of noise generated by the cooling fan 32. The ports 60 are further defined inasmuch as each outer radial portion has an inclined edge 70 extending between the plates 44 and 54. And a port edge 72 extends perpendicularly inwardly from the outer periphery toward the center of the top plate.

In use, the adapter 40 may be installed on to the cooling fan housing 20 with a simple friction fit between the two elements. It will be appreciated that the fan plate 54 is employed to ensure that the muffler 42 is maintained in a plane above the cooling fan 32. As the cooling fan 32 rotates, air is pulled in through the ports 60 and guided by the vanes 62 into the central chamber 68. As the air collects and swirls within the central chamber 68, it is then drawn in axially by the cooling fan 32 and exhausted over the motor windings which are the primary heat generating elements within the motor 16. The cooling air dissipates the heat generated by the windings and is exhausted out through the holes 37. It has been found that the adapter 40 and its related configurations reduce the amount of noise generated by cooling fans of prior art by about 2 dB. This is a significant improvement in the art. The adapter 40 is especially suited for modifying existing motor assemblies already in the field.

Figure 5:
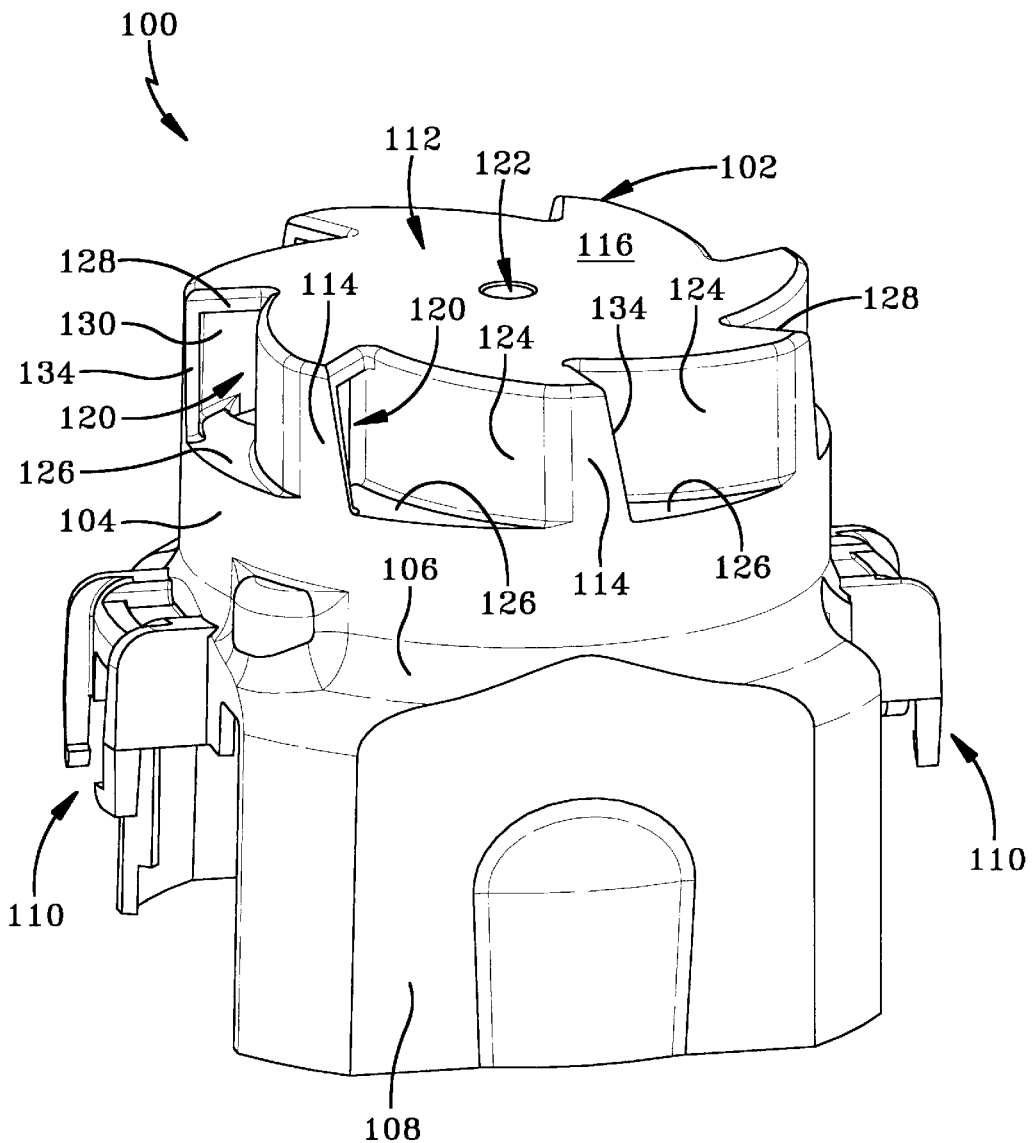
FIG. 5 is a top perspective view of a motor cooling fan housing with an integral muffler.
Figure 6:
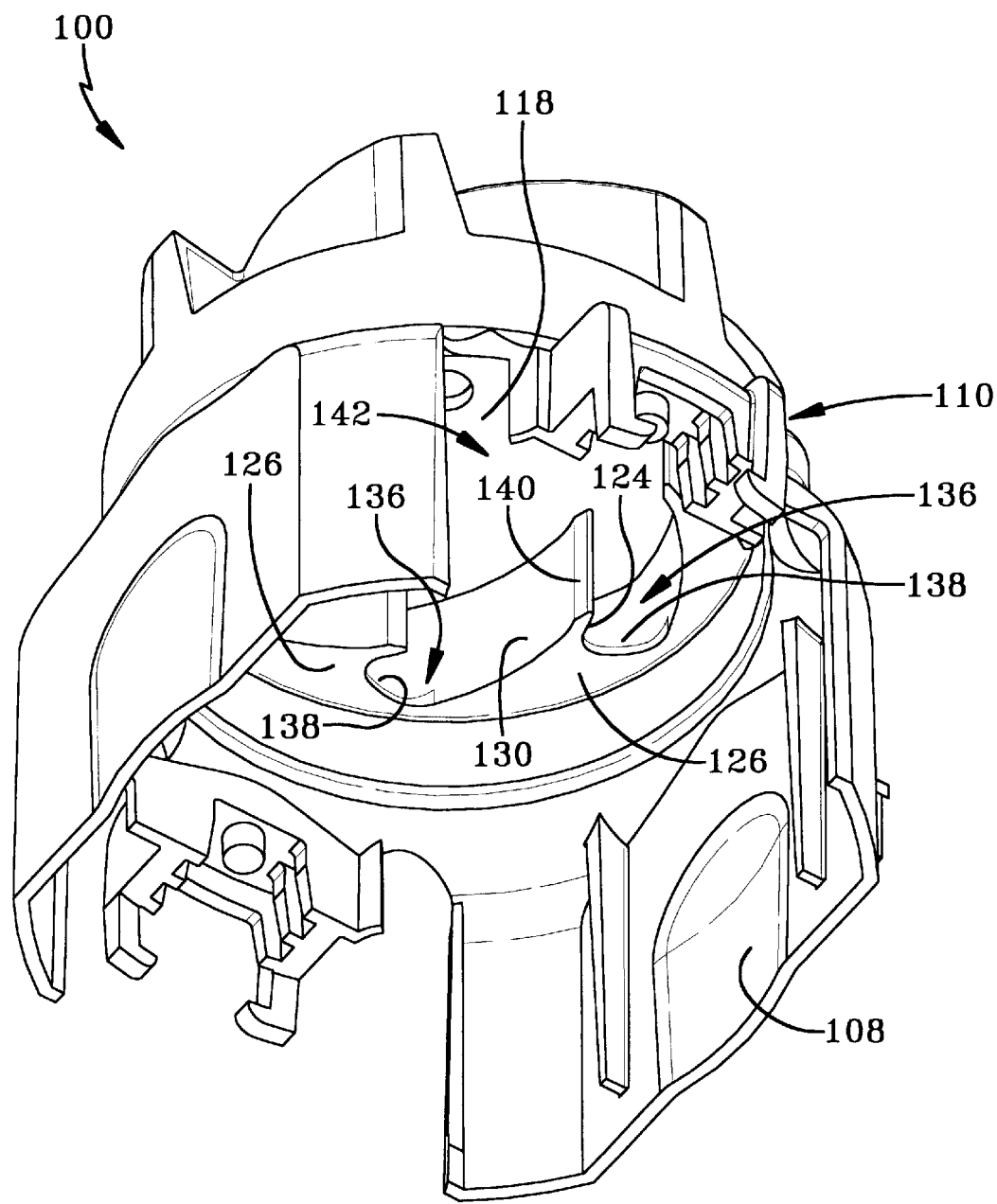
FIG. 6 is a bottom perspective view of the motor cooling fan housing shown in FIG. 5.

Referring now to FIGS. 5 and 6, it can be seen that a radial inflow cooling fan housing is designated generally by the numeral 100. The housing 100 is different from the adapter in that the radial entry ports and related muffler components are integral with the cooling fan housing. The housing 100 includes a muffler, designated generally by the numeral 102. Extending downwardly from the muffler 102 is a fan chamber wall 104 from which extends a chamfer 106 from which further extends a side wall 108. Extending from the chamfer 106, at opposed ends, are a pair brush holders 110 which hold a pair of carbon brushes used in operation of the motor assembly 16.

The muffler 102 includes a top plate 112 which has a periodic, downwardly extending outer periphery wall 114. The top plate 112 provides an exposed surface 116 that faces away from the cooling fan 32. Opposite the exposed surface is the inner surface 118 best seen in FIG. 6.

Radially disposed about the muffler 102 are a plurality of radial air entry ports designated generally by the numeral 120. In much the same way as described in the operation of the muffler 42, rotation of the cooling fan 32 draws air in radially first and then collects within the muffler 102 for axial movement by the cooling fan. The top plate 112 may provide a center hole 122 for the primary purpose of allowing access to the shaft 18 if needed. Any noise reduction or airflow benefits attributable to the hole 122, at this time, are considered to be insignificant.

The muffler 102 includes a series of outer curvilinear walls 124 which extend from the top plate 112 to a fan plate 126. The fan plate 126 is substantially parallel with respect to the top plate 112. And the fan plate 126 extends substantially perpendicular from the fan chamber wall 104. It will be appreciated that each outer curvilinear wall 124 extends from a corresponding outer periphery wall 114 radially inwardly toward the center of the top plate. A port edge 128 extends perpendicularly inwardly from each outer periphery wall 114 generally toward the center of the top plate 112. Facing each outer curvilinear wall 124 at the port edge 128 is an inner curvilinear wall 130 which is essentially an opposite surface of a next adjacent outer curvilinear wall. The inner curvilinear wall 130 extends between the fan plate and the top plate at the radial air entry port 120. At the outer periphery wall 114, each inner curvilinear wall 130 provides an inclined edge 134 that extends between the top plate and the fan plate.

As best seen in FIG. 6, the curvilinear walls 124,130 extend generally in toward the center of the top plate along the inner surface 118. Accordingly, the radial air entry ports 120 extend into the interior of the housing 100 to a full opening, designated generally by the numeral 136. The fan plate 126 is provided with a plurality of notches 138 which, in this embodiment, are shaped and are bounded by facing outer and inner curvilinear walls 124, 130. Those skilled in the art will appreciate that the notches 138 may be provided in any type of shape which facilitates the flow of cooling air and reduces noise generated by the cooling fan. The inner curvilinear walls 130 and the outer curvilinear walls 124 converge at a finger 140 prior to the curvilinear walls reaching the center of the top plate 112. The ends of the fingers 140 terminate at a predetermined concentric area so as to form an air collection chamber 142. In this instance, the cooling fan is positioned below the fan plate 126. Accordingly, air is drawn in predominantly radially from the entry ports 120 and is then transitioned into an axial direction in the vicinity of the air collection chamber 142. Although in the preferred embodiment, the fan is positioned below the fan plate, it will be appreciated that the housing could be configured such that the blades of the cooling fan may extend into the air collection chamber so as to further improve the airflow characteristics.

With both embodiments, either the integral housing or the unitary adapter configuration, the solid top plate provides a natural barrier to sound, while the radial air entry ports attenuate the sound to the side so that noise is readily dispersed and diminished. In the integral embodiment, testing reveals that there is almost an overall 4.0 dB(A) reduction in noise over the prior art configurations. It is theorized that by providing the air inlets in a position radial with respect to the outer periphery of the cooling fan, that the noise generated by the fan is primarily reflected back into the motor housing. Accordingly, by placing the air entry ports at a position away from the axial or cylindrical cone of the cooling fan, noise is contained within the motor housing while air flow into the cone is then redirected axially. In other words, the present invention provides radial air entry points that are positioned away from the normal axial airflow of the cooling fan. It should be appreciated that by directing the radial air entry flow into the axial airflow of the cooling fan, that significant noise reduction is realized. It also has been found that by configuring the positioning and shape of the vanes that airflow is not detrimentally affected.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of true scope and breadth of the invention, reference should be made to the following claims.

What is claimed is:

1. A bypass discharge motor assembly with improved noise reduction comprising:
    a motor assembly having a rotatable shaft;
    a working air fan assembly rotated by said shaft;
    a cooling fan rotated by said shaft; and
    a cooling fan housing coupled to said motor assembly and partially enclosing said cooling fan, said cooling fan housing having at least one vane forming a radial air entry port for predominantly radially receiving cooling air drawn into said housing by said cooling fan.

2. The assembly according to claim 1, wherein said cooling fan housing comprises a unitary muffler secured to said housing, said unitary muffler having a plurality of said radial air entry ports.

3. The assembly according to claim 2, wherein said muffler comprises:
    a top plate; and
    a plurality of vanes extending from said top plate, each said radial air entry port disposed between adjacent vanes.

4. The assembly according to claim 2, wherein said muffler comprises:
    a top plate; and
    a plurality of vanes extending down from said top plate, each said vane having an outer radial portion which is aligned with said top plate's outer periphery, and an inner radial portion extending in toward said top plate's center from said top plate's outer periphery.

5. The assembly according to claim 4, wherein said top plate, said plurality of vanes and said cooling fan housing form said plurality of radial air entry ports.

6. The assembly according to claim 1, further comprising a muffler integral with said cooling fan housing, said muffler having a plurality of said radial air entry ports.

7. The assembly according to claim 6, wherein said muffler comprises:
    a top plate;
    a fan chamber wall; and
    a plurality of outer periphery walls connecting at least portions of said top plate to said fan chamber wall.

8. The assembly according to claim 7, further comprising:
    a fan plate substantially parallel with said top plate; and
    a plurality of outer curvilinear walls connecting said fan plate to said top plate, each said outer curvilinear wall extending from a corresponding one of said outer periphery walls.

9. The assembly according to claim 8, wherein each outer curvilinear wall extends inwardly from said corresponding outer periphery wall.

10. The assembly according to claim 9, wherein each said radial air entry port is formed by said top plate, said fan plate, and one of said outer periphery walls.

11. The assembly according to claim 8, wherein said fan plate has a flow opening therethrough substantially concentrically aligned with said cooling fan such that rotation of said cooling fan draws in cooling air through said radial air entry ports through said flow opening and exhausts the cooling air over the motor assembly.

12. The assembly according to claim 11, wherein said fan plate has a plurality of notches that are contiguous with said flow opening, each said notch positioned between adjacent curvilinear walls.

13. The assembly according to claim 11, wherein said fan plate is positioned below said top plate and said cooling fan is positioned below said fan plate.

14. The assembly according to claim 6, further comprising:
a pair of opposed brush holders extending from said cooling fan housing.

15. A muffler for motor assemblies that include a cooling fan comprising:
a top plate; and
a plurality of vanes extending from said top plate wherein adjacent vanes form a radial air entry port therebetween.

16. The muffler according to claim 15, wherein each said vane has an outer radial portion which is aligned with said top plate's outer periphery, and an inner radial portion extending in toward said top plate's center from said top plate's outer periphery.

17. The muffler according to claim 16, further comprising:
a side wall extending from at least a portion of said plurality of vanes, said side wall adapted for coupling to the motor assembly.

18. A cooling fan housing for motor assemblies that include a cooling fan, comprising:
a sidewall; and
a muffler integrally extending from said sidewall, said muffler having at least one vane forming a radial air entry port for predominantly radially receiving air drawn into the housing by the cooling fan.

19. The cooling fan housing according to claim 18, wherein said muffler comprises:
a top plate;
a fan chamber wall; and
a plurality of outer periphery walls connecting at least portions of said top plate to said fan chamber wall.

20. The cooling fan housing according to claim 19, further comprising:
a fan plate substantially parallel with said top plate; and
a plurality of outer curvilinear walls connecting said fan plate to said top plate, each said outer curvilinear wall extending from a corresponding one of said outer periphery walls, wherein each said outer curvilinear wall extends inwardly from said corresponding outer periphery wall.

21. The cooling fan according to claim 20, wherein said fan plate has a flow opening therethrough substantially concentrically aligned with said cooling fan such that rotation of said cooling fan draws in cooling air through said radial air entry ports through said flow opening and exhausts the cooling air over the motor assembly, wherein said fan plate has a plurality of notches that are contiguous with said flow opening, each said notch positioned between adjacent curvilinear walls, and wherein said fan plate is positioned below said top plate and said cooling fan is positioned below said fan plate.

22. The assembly according to claim 18, further comprising:
a pair of opposed brush holders extending from said side wall.

* * * * *